Patented June 5, 1951

2,555,713

UNITED STATES PATENT OFFICE 2,555,713

VAT DYESTUFFS

Paul Sutter, Binningen, and Walter Kern, Sissach, Switzerland, assignors to Ciba Limited, Basel, Switzerland, a Swiss firm No Drawing. Application July 18, 1949, Serial No. 105,451. In Switzerland July 30, 1948

8 Claims. (Cl. 260—368)

It is known that valuable vat dyestuffs can be made by reacting isophthalic acid or a functional derivative thereof with an amine capable of being vatted. However, some of these dyestuffs are not entirely satisfactory. Thus, there are some yellow dyestuffs which, although possessing useful to good properties of fastness in other respects, have the disadvantage of causing injury to the fiber. By "injury to the fiber" is meant that the dyed fiber suffers greater loss in strength upon exposure to light or exposure to the weather than does the undyed fiber. It is also well known that there are dyestuffs which have the property of protecting the fiber in that the dyed fiber is more resistant than the undyed fiber. However, within the range of yellow to red vat dyestuffs a certain or even considerable injury to the fiber is often found.

It is an object of the present invention to provide valuable new vat dyestuffs within the range of yellow which possess the same configuration as those referred to above but are remarkably superior by causing no or less injury to the fiber than the old dyestuffs, thus combining this valuable property with the valuable properties of the previously known dyestuffs. Other objects will appear as the specification proceeds.

According to the present invention valuable vat dyestuffs are made by acylating a compound of the general formula

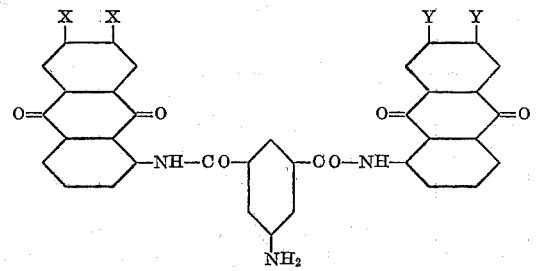

in which one X and one Y each represent hydrogen and the other X and the other Y each represent a halogen atom or hydrogen, with a reactive derivative of an aromatic mono-carboxylic acid.

The compounds of the above general formula used as starting materials in the present process can be obtained, for example, by nitrating isophthalic acid, converting the 5-nitro-isophthalic acid so obtained into a functional derivative, more especially the acid chloride, reacting the derivative with 2 mols of a 1-aminoanthraquinone which may contain a halogen atom in the 6- or 7-position or with 2 mols of two different 1-aminoanthraquinones of that kind, and finally reducing the nitro group. Thus, in the above formula both X's and both Y's may represent hydrogen or, for example, one X may represent a halogen atom, for example, a chlorine or bromine atom, or finally one X as well as one Y may represent halogen.

As reactive derivatives of aromatic mono-carboxylic acids there may be used with advantage the acid halides, especially the acid chlorides.

As examples of aromatic mono-carboxylic acids which, as stated above, are advantageously used in the form of their chlorides, there may be mentioned anthraquinone carboxylic acids especially anthraquinone-$\beta$-carboxylic acids, which may contain further substituents, but advantageously aromatic mono-carboxylic acids which contain at most two aromatic rings which may be condensed rings, such as naphthalene carboxylic acids, diphenyl carboxylic acids or diphenyl sulphone carboxylic acids, and especially benzene carboxylic acids.

The aforesaid mono-carboxylic acids may with advantage contain further substituents of the kind customarily present in vat dyestuffs. There are used with special advantage in the present invention benzene carboxylic acids or their reactive derivatives which contain as a nuclear substituent a sulphur atom bound to a further carbon atom. As examples of such substituents there may be mentioned alkyl-sulphone groups, especially methyl-sulphone groups, aryl sulphone groups, especially phenyl sulphone groups, and also alkyl-mercapto groups, especially the methyl-mercapto group. There also comes into consideration as a nuclear substituent a dialkyl sulphonamido group.

The acylation of the amino group may advantageously be conducted in a high boiling solvent such as nitrobenzene at a temperature of about or considerably higher than 100° C., for example, at the boiling point of the solvent. Depending on the circumstances, it may be of advantage to add a condensing agent or an agent capable of binding acid. The reaction generally occurs with remarkable ease, which could hardly have been expected having regard to the relatively large molecule of the compounds of the above general formula.

The dyestuffs of the invention may be used as pigment dyestuffs. They are also suitable for dyeing or printing a very wide variety of fibers, especially cellulosic fibers such as cotton, and artificial silk and staple fibers of regenerated cellulose, by the methods usual for vat dyestuffs.

The following examples illustrate the invention, the parts and percentages being by weight unless otherwise stated, and the relationship between parts by weight and parts by volume being the same as that of the kilogram and the litre.

*Example 1*

21.6 parts of 5-amino-isophthaloyl - di-(1'-anthraquinonyl)-amide of the formula

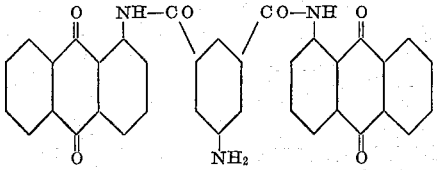

and 8.8 parts of meta-methylsulphonyl - benzoyl chloride of the formula

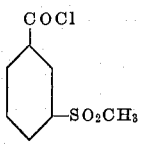

are heated in 1200 parts of nitrobenzene at the boil until the reaction is complete. The whole is allowed to cool, the product is separated by filtering with suction and washed first with nitrobenzene and then with benzene and dried. There is obtained in good yield a yellow powder which dyes cotton from a violet vat yellow tints of good fastness, which are distinguished especially by causing little injury to the fiber.

By using instead of meta-methylsulphonyl-benzoyl chloride the corresponding quantity of benzoyl chloride there is also obtained a yellow dyestuff which dyes cotton from a violet vat yellow tints.

The 5-amino - isophthaloyl - di-(1'-aminoanthraquinonyl)-amide used in this example is obtained as follows:

125 parts of 5-nitro-isophthalic acid dichloride (obtainable by nitrating isophthalic acid in concentrated nitric acid and treating the resulting 5-nitro-isophthalic acid with thionyl chloride) are heated with 220 parts of 1-aminoanthraquinone in 1800 parts of nitrobenzene for ½ hour at the boil. After cooling, the product is separated by filtering with suction and worked up in the usual manner. The resulting 5-nitro-isophthaloyl-di-(1'-anthraquinonyl)-amide is converted by vatting with hydrosulphite and caustic soda solution into the corresponding amino derivative which can be recrystallized from nitrobenzene.

By using for preparing the starting material instead of 1-aminoanthraquinone, halogen substituted 1-aminoanthraquinones and/or as acylating agents acid chlorides of other aromatic monocarboxylic acids the vat dyestuffs of the following table can be obtained:

| Anthraquinone component | Acid chloride component | Color of the dyeing on cotton |
|---|---|---|
| 1-Aminoanthraquinone | ClOC—⬡—SO₂—CH₃ | Yellow |
| Do. | ClOC—⬡—SO₂N(CH₃)₂ | Do. |
| Do. | ⬡—SO₂—⬡—COCl | Do. |
| 1-Amino-6-chlor-anthraquinone | COCl—⬡—SO₂CH₃ | Do. |
| Do. | ⬡—COCl | Do. |
| 1-Aminoanthraquinone | (naphthyl)—COCl | Do. |
| 1-Amino-6-chlor-anthraquinone | (naphthyl)—COCl | Do. |
| Do. | ⬡—⬡—COCl | Do. |
| 1-Aminoanthraquinone | COCl—⬡—SCH₃ | Do. |

Example 2

2 parts of the dyestuff obtained as described in the first paragraph of Example 1 are vatted at 50° C. in 400 parts of water with the addition of 8 parts by volume of caustic soda solution of 36° Bé. and 4 parts of sodium hydrosulphite. The resulting stock vat is added to a dyebath which contains 2600 parts of water, 7 parts by volume of caustic soda solution of 36° Bé. and also 4 parts of sodium hydrosulphite. 100 parts of well wetted cotton are entered at 40° C. and, after 15 minutes, 60 parts of sodium chloride are added. Dyeing is carried on for 1 hours during which the temperature is raised to 50° C. The cotton is then squeezed, oxidized in the air, rinsed, acidified, again rinsed, and soaped at the boil. The material is dyed a yellow tint of good fastness which is distinguished especially by causing little injury to the fiber.

What we claim is:

1. A vat dyestuff of the general formula

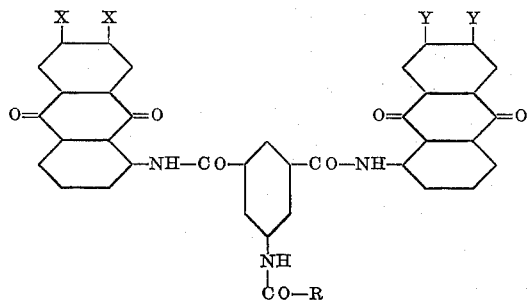

wherein at most one X and one Y stand for a halogen atom, the remaining symbols X and Y stand for hydrogen, and —CO—R stands for the radical of an aromatic mono-carboxylic acid.

2. A vat dyestuff of the general formula

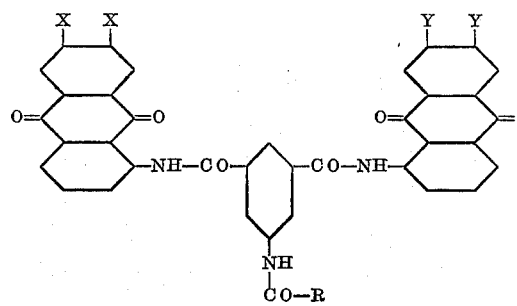

wherein at most one X and one Y stand for a halogen atom, the remaining symbols X and Y stand for hydrogen, and —CO—R stands for the radical of an aromatic mono-carboxylic acid containing up to two sixmembered carbon rings.

3. A vat dyestug of the general formula

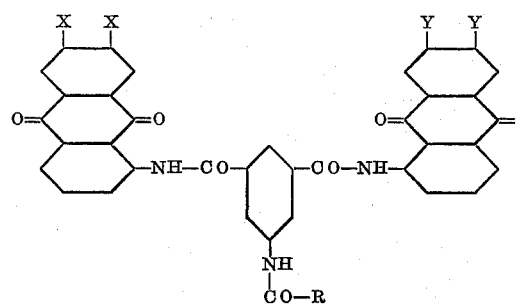

wherein at most one X and one Y stand for a halogen atom, the remaining symbols X and Y stand for hydrogen, and —CO—R stands for the radical of an aromatic mono-carboxylic acid of the benzene series.

4. The vat dyestuff of the formula

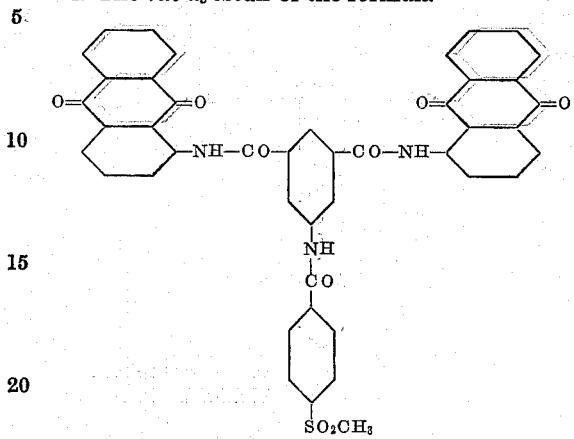

5. The vat dyestuff of the formula

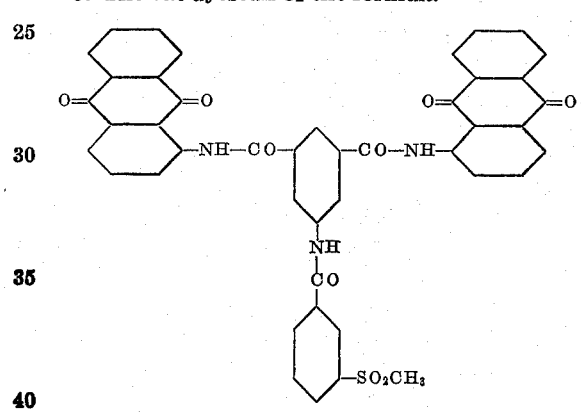

6. The vat dyestuff of the formula

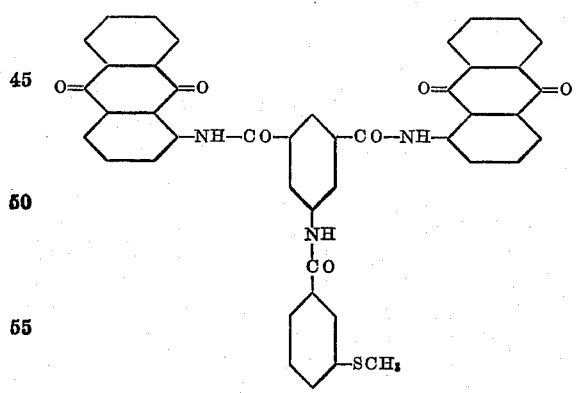

7. The vat dyestuff of the formula

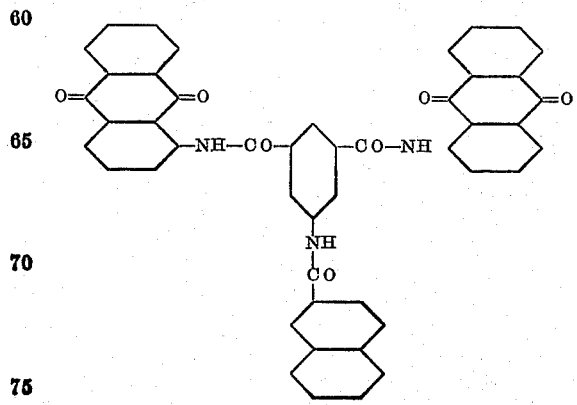

8. The vat dyestuff of the formula
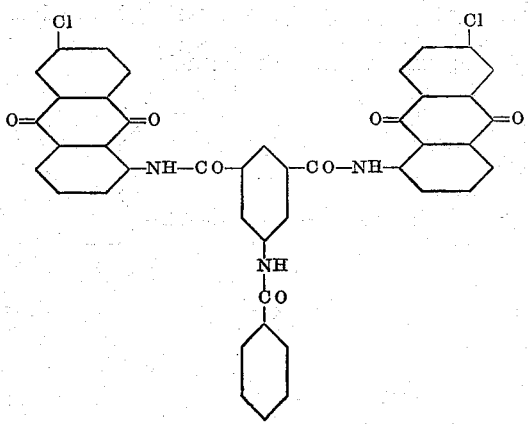
PAUL SUTTER.
WALTER KERN.
REFERENCES CITED
The following references are of record in the file of this patent:
Beilstein, Vol. 14, 4th edition, p. 182.